United States Patent
Yamaoka et al.

(10) Patent No.: US 9,024,548 B2
(45) Date of Patent: May 5, 2015

(54) METHOD OF CONTROLLING LINEAR MOTOR

(71) Applicant: OKUMA Corporation, Aichi (JP)

(72) Inventors: Fumiki Yamaoka, Aichi (JP); Yoichi Kawai, Aichi (JP)

(73) Assignee: OKUMA Corporation, Niwa-gun, Aichi (JP)

( * ) Notice: Subject to any disclaimer, the term of this patent is extended or adjusted under 35 U.S.C. 154(b) by 154 days.

(21) Appl. No.: 13/750,461

(22) Filed: Jan. 25, 2013

(65) Prior Publication Data

US 2013/0193901 A1 Aug. 1, 2013

(30) Foreign Application Priority Data

Jan. 26, 2012 (JP) .................................. 2012-013669
Oct. 5, 2012 (JP) .................................. 2012-223520

(51) Int. Cl.
*H02P 1/00* (2006.01)
*H02P 6/00* (2006.01)

(52) U.S. Cl.
CPC ...................................... *H02P 6/006* (2013.01)

(58) Field of Classification Search
USPC ....................... 318/135, 687; 310/12.01, 12.15
See application file for complete search history.

(56) References Cited

U.S. PATENT DOCUMENTS

| | | | | |
|---|---|---|---|---|
| 4,983,900 A | * | 1/1991 | Nashiki et al. | 318/652 |
| 5,097,161 A | * | 3/1992 | Nashiki et al. | 310/12.32 |
| 6,286,055 B1 | * | 9/2001 | Yamazaki et al. | 710/1 |
| 7,154,198 B2 | * | 12/2006 | Kawai | 310/12.15 |
| 7,839,029 B2 | * | 11/2010 | Mayaji et al. | 310/12.01 |
| 7,906,877 B2 | * | 3/2011 | Okada et al. | 310/15 |
| 2010/0044144 A1 | * | 2/2010 | Tajima et al. | 180/443 |

FOREIGN PATENT DOCUMENTS

| JP | 2007318839 A | 12/2007 |
|---|---|---|
| JP | 2008178237 A | 7/2008 |

OTHER PUBLICATIONS

Patent Abstracts of Japan, Publication No. 2007-318839, Published on Dec. 6, 2007, 1 page.
Patent Abstracts of Japan, Publication No. 2008-178237, Published on Jul. 31, 2008, 1 page.

* cited by examiner

*Primary Examiner* — Rina Duda
(74) *Attorney, Agent, or Firm* — Osha Liang LLP (57) ABSTRACT

In a linear motor used for a driving axis of a large-size machine tool having a very long driving stroke, pole position correction values at a plurality of stroke positions are stored in a memory. A pole position correction value corresponding to an actual stroke position of a slider is calculated based on the stored pole position correction value. A corrected electrical angle offset value derived based on the calculated pole position correction value is used to control the linear motor.

14 Claims, 9 Drawing Sheets

| STROKE POSITION (EXAMPLE) | POLE POSITION CORRECTION VALUE (EXAMPLE) |
|---|---|
| A = 0 | δ1 |
| B = L0 | δ2 |
| C = L0 × 2 | δ3 |

: STATOR SEGMENT 102A
: STATOR SEGMENT 102B
: STATOR SEGMENT 102C

FIG. 7A

| STROKE POSITION (EXAMPLE) | POLE POSITION CORRECTION VALUE (EXAMPLE) |
|---|---|
| A = 0 | δ1 |
| B = L0 / 2 | δ2 |
| C = L0 | δ3 |
| D = L0 × 2 | δ4 |
| E = L0 × 3 | δ5 |

: STATOR SEGMENT 102A
  SAME AS ABOVE
: STATOR SEGMENT 102B
: STATOR SEGMENT 102C
  SAME AS ABOVE

FIG. 7B

| STROKE POSITION (EXAMPLE) | POLE POSITION CORRECTION VALUE (EXAMPLE) |
|---|---|
| A = 0 | δ1 |
| B = L0 × 3 | δ2 |

: STATOR SEGMENT 102A
: STATOR SEGMENT 102C

METHOD OF CONTROLLING LINEAR MOTOR

PRIORITY INFORMATION

This application claims priority to Japanese Patent Applications No. 2012-013669 filed on Jan. 26, 2012, and No. 2012-223520 filed on Oct. 5, 2012, which are incorporated herein by reference in their entirety.

BACKGROUND

1. Technical Field

The present invention relates to control of a linear motor.

2. Related Art

In recent years, in axial driving of a machine tool, a method which directly drives a table with an electrical motor (hereinafter, the electrical motor will be simply referred to as a "motor") and without the use of a ball screw has been commercialized. In the machine tool of this type, a linear motor is used.

In the driving method using a linear motor, because there is no speed reducing element such as the ball screw, the positioning precision for a slider of the linear motor directly corresponds to a positioning precision of the driving axis. Therefore, a high positioning precision is demanded for the linear motor. Normally, when a linear motor is used, a high resolution position detector is mounted to detect a position of the driving target.

A linear motor comprises a slider which is mounted on a mobile unit such as a table and a stator which is mounted on a fixed unit such as a bed. There are various types of linear motor depending on the principle. For example, as described in JP 2007-318839 A, there is a type where a stator having salient poles arranged with a predetermined pitch on surfaces which oppose each other is used. On a stator which is provided extending in a straight line shape, salient poles are arranged along the direction of extension of the stator. On the slider which can move along the stator which is provided in an extended manner, magnetic poles are provided opposing the salient poles of the stator. The magnetic pole is formed by a coil and a permanent magnet. When a predetermined electric power is supplied to the coil, a moving magnetic field is formed in the direction of extension of the stator, and the slider moves in the direction of extension of the stator due to an interaction between the moving magnetic field and the salient pole.

Figure 1:
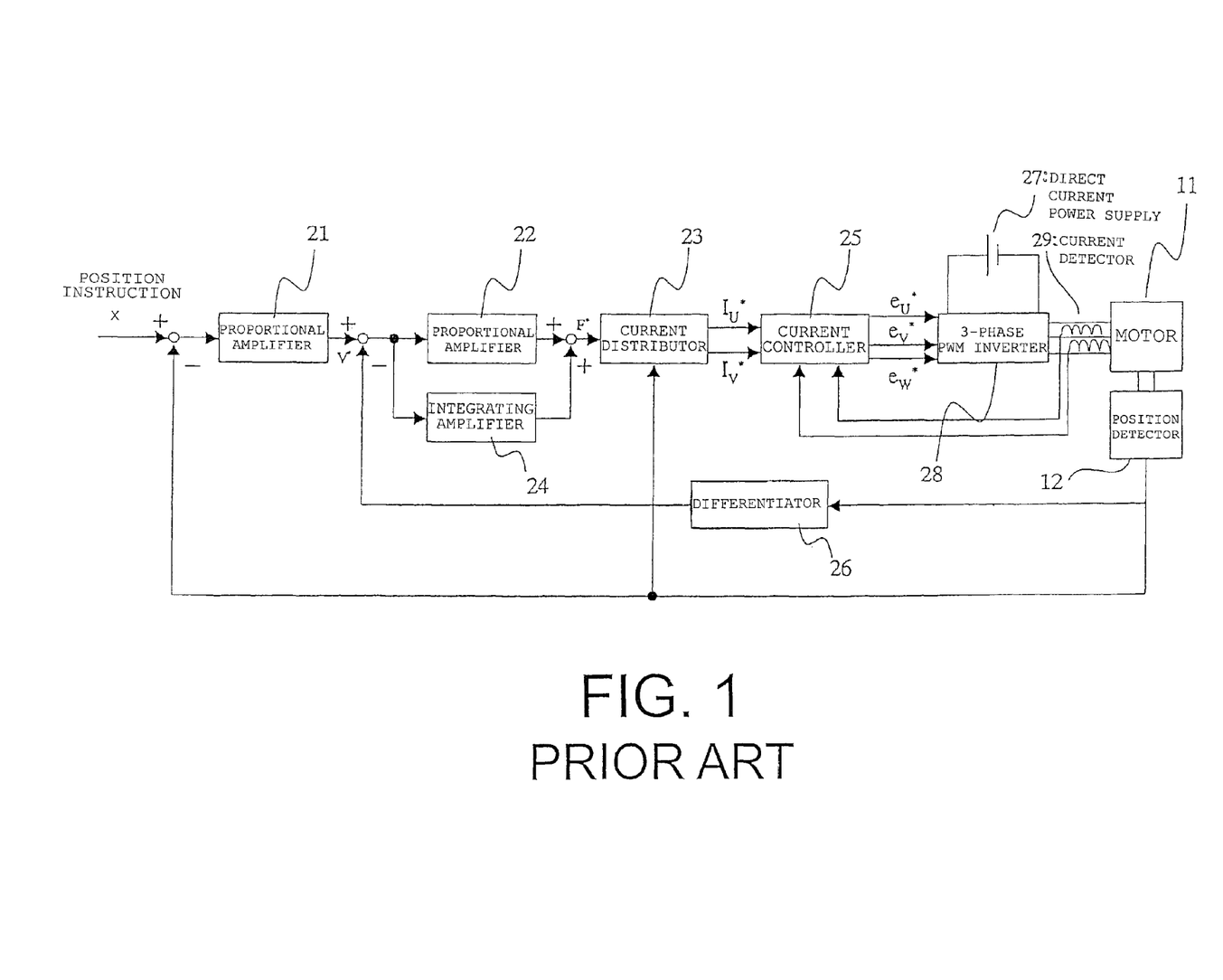
FIG. 1 is a block diagram showing a structure of a control device of a linear motor.

Next, a typical method of controlling a linear synchronous motor will be described. FIG. 1 is a block diagram showing a structure of a control device of a linear motor. The control device of the linear motor comprises a position detector 12, proportional amplifiers 21 and 22, a current distributor 23, an integrating amplifier 24, a current controller 25, a differentiator 26, a 3-phase PWM inverter 28, and a current detector 29. In this control device, when a position instruction X is input, a difference between the position instruction value and a detection value of the position detector 12 which represents the position of the slider is amplified by the proportional amplifier 21, and is output as a velocity instruction V* of the slider of the linear motor. A difference between the velocity instruction V* and a velocity of the slider obtained by differentiating the detection value of the position detector 12 by the differentiator 26 is PI-calculated by the proportional amplifier 22 and the integrating amplifier 24, and a thrust instruction F* is generated. Upon receiving input of the thrust instruction F*, the current distributor 23 generates, of the 3-phase current instructions Iu*, Iv*, and Iw*, current instruction values Iu* and Iv*, and outputs these instruction values to the current controller 25. In this process, when the current instruction is generated, the detection value by the position detector 12 is taken into consideration.

The current controller 25 generates 3-phase voltage instructions eu*, ev*, and ew* based on the current instructions Iu* and Iv* which are input from the current distributor 23 and a current instruction Iw* derived from a relationship equation Iu*+Iv*+Iw*=0, and outputs the voltage instructions to the 3-phase PWM inverter 28. The linear motor is driven by applying 3-phase alternating current voltage converted by the inverter 28 from the direct current voltage, supplied from a direct current power supply 27, based on the 3-phase voltage instructions eu*, ev* and ew*. The voltages actually applied to the linear motor are the 3-phase voltage instructions eu*, ev*, and ew* determined by the current controller 25 from the differences from the current detection values iu, iv, and iw detected by the current detector 29.

In the above-described control method, in order to maximize the thrust of the linear motor with the same current, the current must be applied with an optimum current phase angle corresponding to the position of the slider, in particular, the position of the magnetic pole of the slider with respect to the salient pole of the stator.

Figure 2:
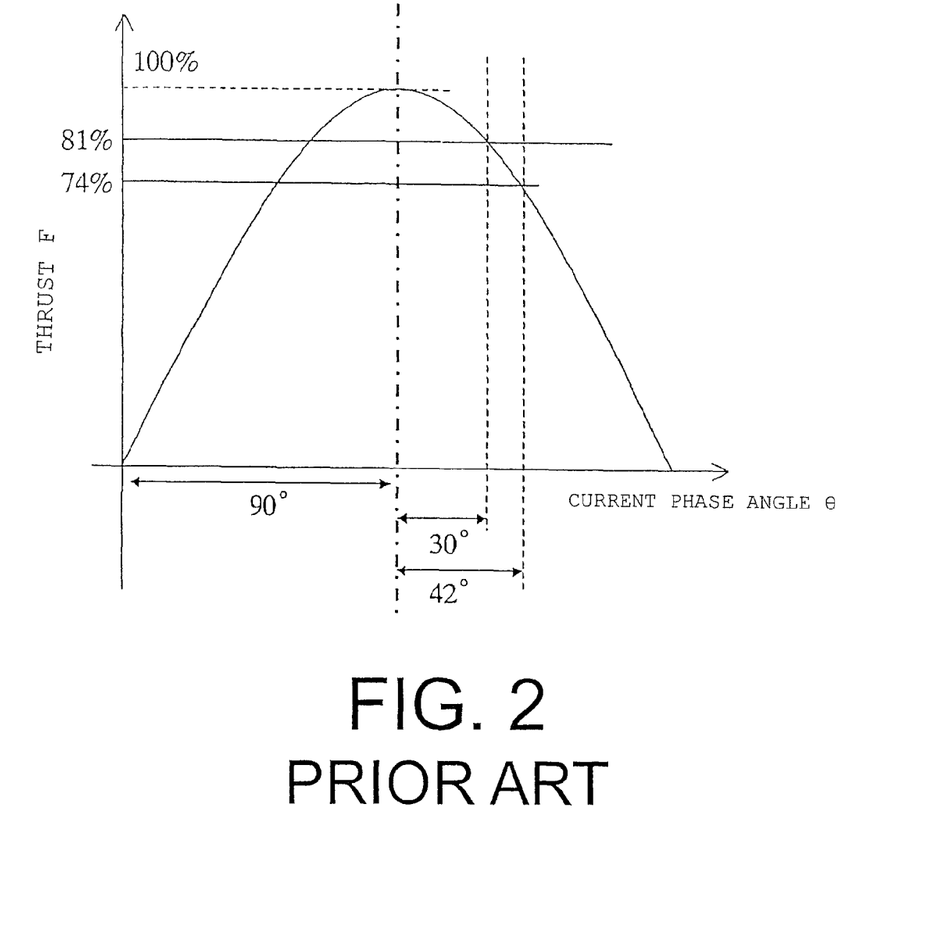
FIG. 2 is a diagram showing a relationship between a current phase angle and a thrust in a linear motor.

A phase angle which is the optimum current phase angle will now be described. FIG. 2 is a diagram showing a thrust generated by the linear motor when the slider is slid with respect to the stator with a constant current. It can be understood from FIG. 2 that the thrust of the linear motor is maximized when the current phase angle is 90°.

In actual operation, the control device of the linear motor applies a current to the coil of the magnetic pole to achieve the current phase angle of 90° while monitoring the position of the slider obtained by the position detector, that is, the position of the magnetic pole of the slider. In this process, in order for the control device to apply the current at an accurate current phase angle, the position detector, the slider, and the stator must be mounted at predetermined positions. If the mounting position is deviated, the position detector cannot accurately detect the position of the magnetic pole of the slider, the current is deviated from the optimum phase angle, and the thrust is reduced.

In reality, however, the linear motor and the position detector cannot be accurately mounted at the predetermined positions because there exist a size tolerance of the components and backlash of the mounting bolt and the bolt hole, and thus, it is difficult to apply the current at the optimum phase angle.

More specific description will now be given. A current phase of 360° of a linear motor having the characteristic shown in FIG. 2 is assumed to correspond to a mechanical phase (pitch) of 12 mm. Under this condition, if the mounting positions of the slider, stator, and position detector are deviated by 30° (1 mm in mechanical phase) from the predetermined positions, as shown in FIG. 2, the thrust is reduced by 19% from the maximum thrust which can be obtained when the current is applied at the optimum phase angle. In order to prevent such a reduction of the thrust, as disclosed in JP 2008-178237 A, a magnetic pole position correcting method is proposed in which a magnetic pole position correction value is stored in the control device, and the position of the magnetic pole of the position detector is electrically corrected.

In large-size machine tools in which a driving stroke of the linear motor is very long, a stator which is divided into a plurality of portions may be used. That is, a stator may be formed by arranging a plurality of stator segments which are the divided portions, according to the length of the stroke.

Due to the length size error and the mounting error of each stator segment, the pitch of the salient poles of the stator would be deviated between the front end and the rear end of the stator. In the magnetic pole position correction method of the related art, because there is only one magnetic pole position correction value, locations where the thrust is reduced are created depending on the position on the stator.

More specific description will now be given. It is assumed that, in the linear motor shown in FIG. 2, the current phase of 360° corresponds to a mechanical phase (pitch) of 12 mm, the stroke of the stator is 9000 mm, and 15 stator segments of the linear motor each having a size of 600 mm are arranged. Under these conditions, if the length size error of the stator is 0.1 mm and the mounting error is 0.1 mm, the pitch deviation of the salient pole of the stator at the stroke end with respect to the stroke center is at maximum 42° (or 1.4 mm in the mechanical phase). Therefore, when the overall region of the stroke is controlled using the magnetic pole position correction value determined at the center of the stroke, as shown in FIG. 2, the thrust obtained at the stroke end is reduced by 26% compared to the thrust obtained at the stroke center.

The stators divided into a plurality of portions include, in addition to the physically divided structure, a structure in which the stator is formed part by part in the manufacturing process. The stator is formed by layering steel sheets on one side of which recesses and projections are formed, and the projected portion becomes the salient pole. The steel sheet having the recess-and-projection shape is manufactured by stamping with a punch having a corresponding recess-and-projection shape. In the stamping, machining is executed a plurality of times while the punch is relatively fed with respect to a single material. In general, the punch is fixed and the material is sequentially fed into machine a plurality of times. After the stamping is executed once, the material is fed by the size of the punch, and the second stamping is executed at this position. These processes are repeated, to manufacture the steel sheet which is longer than the size of the punch and which has the recess-and-projection shape. In the following description, in addition to the portion of the stator which is physically divided, the portion of the stator in which the recess and projection are formed by a single stamping is also described as a "stator segment".

The stator formed by executing stamping a plurality of times on a single material has a structure in which a plurality of the stator segments each corresponding to a single stamping are arranged in the direction of extension of the stator. In such a case where virtual stator segments are arranged also, the pitch of the salient poles of the stator may be deviated due to position deviation or the like between the stator segments. For example, the position of the salient pole may be deviated due to a size error of the punch in the movement direction of the material or an error in the amount of movement of the material for each machining.

An advantage of the present invention is that a control method having a reduced thrust reduction over the entire length of the stator is provided.

SUMMARY

According to one aspect of the present invention, there is provided a method of controlling a linear motor in which a position deviation of a salient pole of a stator is corrected according to a stroke position of a slider, and the linear motor is driven and controlled based on the corrected position of the salient pole. The stator is placed extending in a predetermined shape. The stator is in general arranged in a straight line shape, but may alternatively have a curved section within a horizontal plane, or have a section with a slope in the up-and-down direction. In the stator, recesses and projections are formed in a direction in which the stator is placed, that is, the direction of extension. The projected portion of the recess and projection is called a salient pole. The slider can move along the direction of extension of the stator. Recesses and projections are also formed on the slider opposing the recesses and the projections of the stator, and magnetic poles are formed. For example, the magnetic pole is formed by a coil wound around the projected portion of the slider and a permanent magnet placed on a surface of the projected portion. When a predetermined electric power is supplied to the coil, a magnetic field which moves in the direction of extension of the stator is formed on the slider. The slider moves by an interaction between the moving magnetic field and the salient pole of the stator. Alternatively, the magnetic pole may be formed on the stator and the salient pole may be formed on the slider. The magnetic pole and the salient pole will hereinafter be collectively referred to as a "pole".

The position of the slider in the linear motor has two aspects. One is the position related to the reciprocating movement when the slider reciprocates (strokes) the driving target along the stator. The other is the relative position between the magnetic pole and the salient pole. The former corresponds to a mechanical angle of a rotational motor and the latter corresponds to an electrical angle of the rotational motor. In the following, the position related to the reciprocating movement along the stator will be described as a "stroke position" and the relative position of the magnetic pole and the salient pole will be described as a "pole position".

As described, the electric power must be supplied at a phase corresponding to the pole position of the slider. For this purpose, a position detector for detecting the stroke position of the slider is provided. Ideally, because the pole position changes at a certain interval with respect to the change of the stroke position of the slider, the pole position of the slider can be easily calculated by detecting the stroke position of the slider. The position detector comprises, for example, a scale placed along the stator, and a detection head provided to integrally move with the slider. When the position of the stator, in particular, the position of the salient pole, is deviated with respect to the scale, a deviation occurs between the stroke position of the slider detected by the position detector and the position of the slider (position of the magnetic pole) with respect to the actual position of the stator (position of the salient pole). In other words, a deviation occurs in the relationship between the stroke position of the slider and the pole position. In the present invention, a correction value for correcting the deviation is acquired in advance for each of a plurality of positions in the direction of extension of the stator, and is stored, so that the pole position of the slider determined from the detected stroke position of the slider is corrected and electric power is supplied based on the phase of the slider which is closer to reality.

A specific form of the method of controlling a linear motor of the present invention will now be described. First, a stroke position of the slider along the direction of extension of the stator is detected. Then, a pole position correction value at the detected stroke position of the slider is derived based on a pole position correction value for correcting the deviation of the pole position of the stator in the direction of extension of the stator and stored in correspondence to the stroke position of the direction of extension of the stator in advance. A pole position of the slider is calculated based on the detected stroke position of the slider and the derived pole position correction value. Electric power is supplied to a coil provided in the stator or in the slider based on the calculated relative position of the pole, and the linear motor is driven.

According to another aspect of the present invention, the stator may be formed by arranging a plurality of stator segments along the direction of extension of the stator, and at least one pole position correction value is stored in advance for each stator segment.

According to another aspect of the present invention, the plurality of stator segments may be segments which are physically divided. Alternatively, the stator segment may be a virtual stator segment. According to another aspect of the present invention, the recess-and-projection shape of the stator may be formed by stamping with a punch on a single material a plurality of times. After stamping with the punch a first time, the material is relatively moved with respect to the punch by an amount corresponding to the size of the punch, and a second machining is executed. These processes are repeated to form a long-length stator. The portion formed by a single stamping becomes the virtual stator segment.

According to another aspect of the present invention, for the pole position correction value, values at stroke positions distanced from each other may be stored, and a pole position correction value for a section between the stroke positions for which the values are stored may be derived as a value equal to the pole position correction value at one end of the section.

According to another aspect of the present invention, for the pole position correction value, values at stroke positions distanced from each other may be stored, and a pole position correction value for a section between the stroke positions for which the values are stored may be derived as an average value of the pole position correction values at both ends of the section.

According to another aspect of the present invention, for the pole position correction value, values at stroke positions distanced from each other may be stored, and a pole position correction value for a section between the stroke positions for which the values are stored may be derived as a value obtained by linearly interpolating the pole position correction values at both ends of the section.

According to another aspect of the present invention, there is provided a method of calculating a pole position of a slider which is a position of a magnetic pole of the slider with respect to a salient pole of a stator of a linear motor, wherein pole position correction values for correcting a position deviation of the salient pole of the stator along a direction of extension of the stator are first acquired at a plurality of positions along the direction of extension of the stator, and the acquired values are stored in correspondence with the position along the direction of extension of the stator. Then, during an operation of the linear motor, a stroke position of the slider in the direction of extension of the stator is detected. Further, the pole position correction value corresponding to the detected stroke position is read, and a pole position correction value at the detected stroke position is calculated. The pole position of the slider is calculated based on the detected stroke position and the calculated pole position correction value.

The stator may have a structure in which a plurality of stator segments are arranged along the direction of extension of the stator, and at least one pole position correction value may be acquired and stored for each stator segment. The plurality of stator segments may be segments which are physically divided or may be virtual stator segments.

Advantageous Effects

With the use of the pole position correction value corresponding to the stroke position of the slider, reduction of thrust due to position deviation of the stator can be inhibited.

DESCRIPTION OF EXEMPLARY EMBODIMENTS

Figure 3:
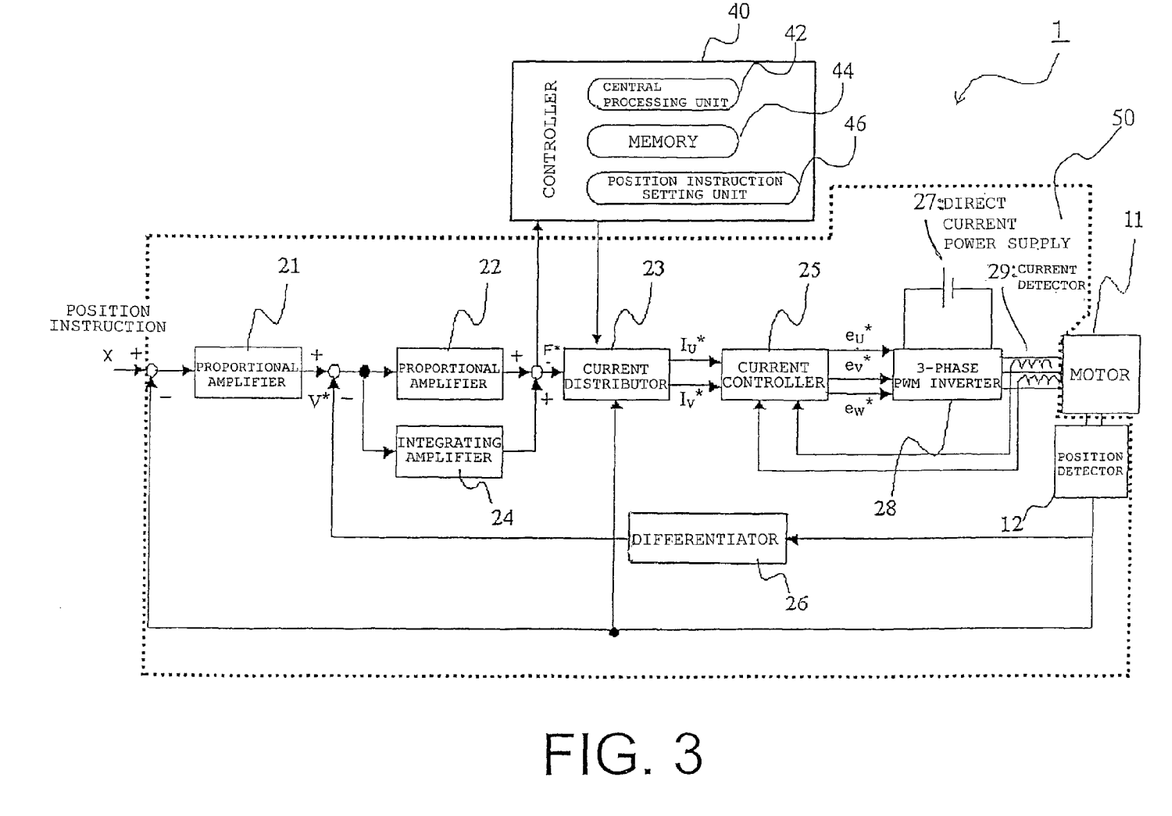
FIG. 3 is a block diagram schematically showing a structure of a motor control device according to a preferred embodiment of the present invention.
Figure 6:
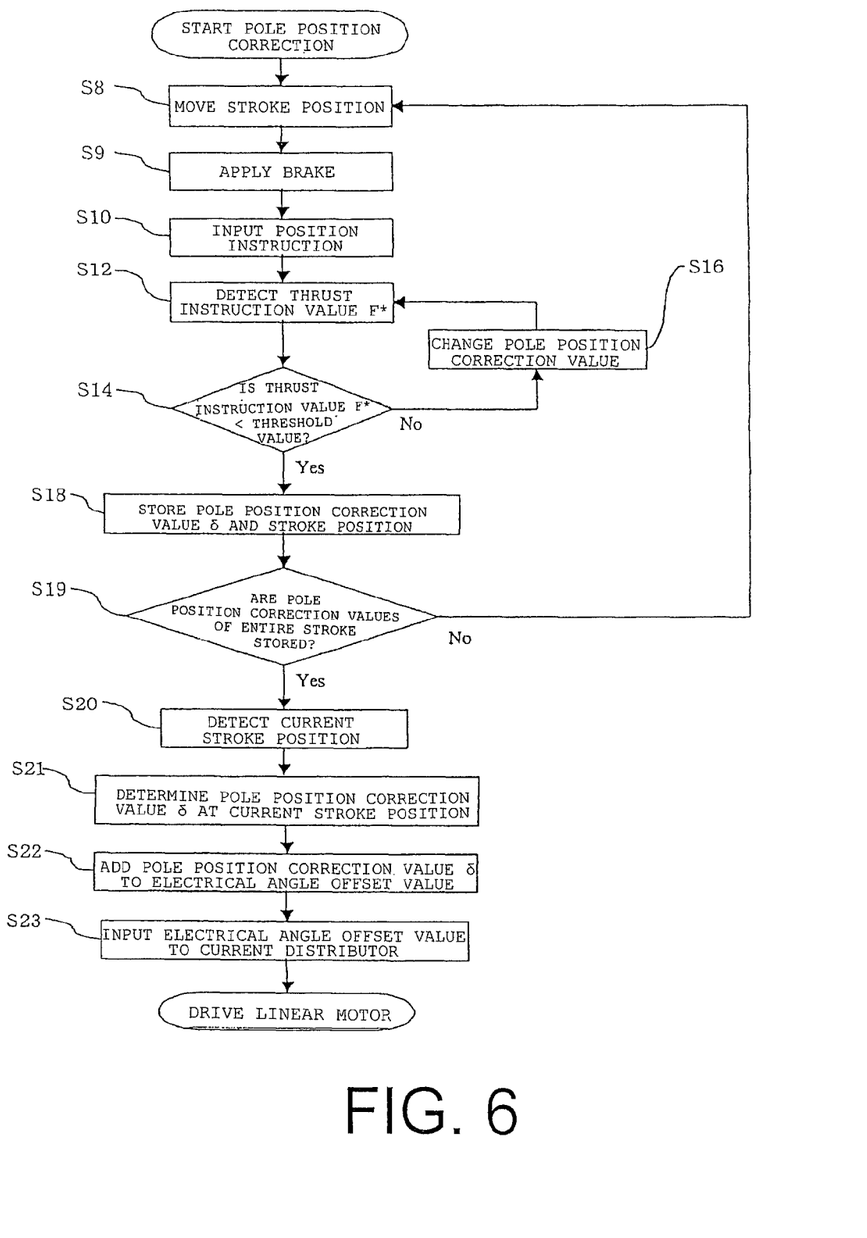
FIG. 6 is a flowchart showing the process from acquisition of a pole position correction value of a linear motor to driving in the present invention.

A preferred embodiment of the present invention will now be described with reference to the drawings. FIG. 3 is a block diagram schematically showing a structure of a motor control device according to a preferred embodiment of the present invention. FIG. 6 is a flowchart showing the process from acquisition of a pole position correction value of a linear motor to driving, according to a preferred embodiment of the present invention. FIGS. 9-12 are diagrams showing interpolation methods of the pole position correction value of the motor according to the preferred embodiment of the present invention.

In FIG. 3, the motor control device comprises a controller 40 having a central processing unit (CPU) 42, a memory 44, and a position instruction setting unit 46. The central processing unit 42 has a function to read a pole position correction program from the memory 44 and to execute the program. The memory 44 is formed with a ROM which stores the pole position correction program in advance, a RAM which stores the detection data or the like in a rewritable manner, etc. The position instruction setting unit 46 has a function to set a position instruction X which is the position instruction of the slider of the linear motor automatically or according to a manual operation by an operator, and to input the position instruction X to the proportional amplifier 21. The position instruction setting unit 46 may include an input unit such as a switch, a keyboard, a dial, or the like, for the manual operation. The other structures of the motor control device 1 are similar to the motor control device of FIG. 1, and are thus assigned the same reference numerals and will not be described again.

As described before, the electric power supplied to the slider of the linear motor must be supplied at a phase angle corresponding to the position of the magnetic pole with respect to the salient pole (pole position). For this purpose, a position detector for detecting the stroke position of the slider is provided. The position detector comprises, for example, a scale placed along the stator and a detection head provided to integrally move with the slider. A positional relationship between an origin of detection of the position detector and the position of the magnetic pole of the slider is determined by the mounting position of the detection head with respect to the slider, but the position includes an error. In order to correct the error, a configuration is employed in which an offset value of an electrical angle can be designated. By designating the electrical angle offset value which is stored in the memory 44 in advance, the error can be corrected, and the relationship between the origin of detection of the position detector and the position of the magnetic pole of the slider can be set constant, without being affected by factors such as the mounting error of the detection head. Moreover, in the present embodiment, the position deviation of the salient pole of the stator and the scale is corrected using the pole position correction value. By adding the pole position correction value to the electrical angle offset value, the position of the magnetic pole of the slider with respect to the scale of the position detector and the position of the magnetic pole of the slider with respect to the salient pole of the stator can be matched.

Figure 4:
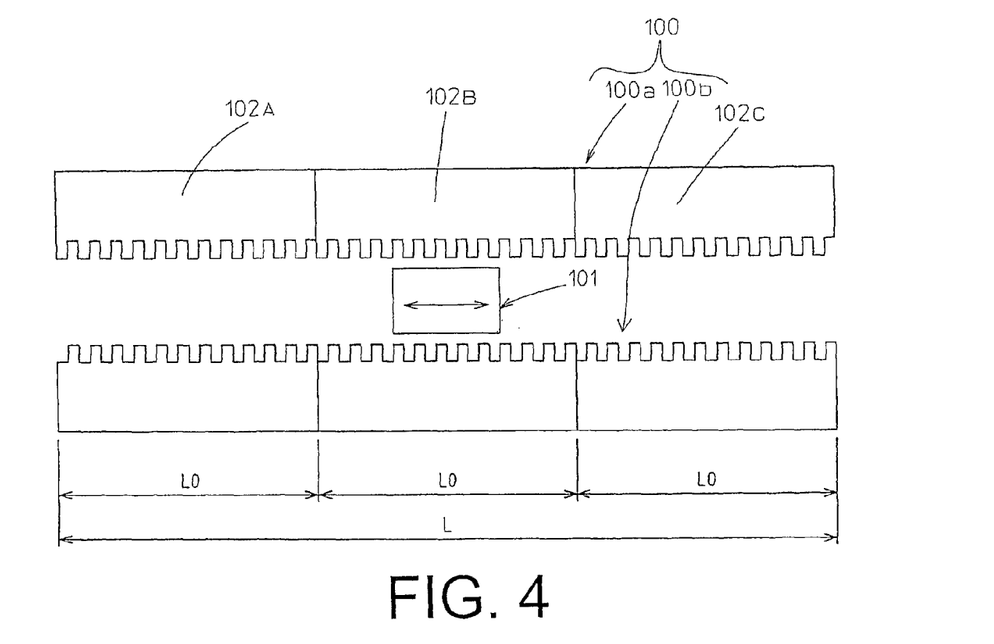
FIG. 4 is a diagram showing an example of a linear motor having a stator formed by arranging a plurality of stator segments.

FIG. 4 is a diagram showing a structure of important portions of a linear motor 11. A stator 100 is provided extending to a length L. Stators 100a and 100b forming a pair are placed parallel to each other. Each of the stators 100a and 100b has a band shape, a recess-and-projection shape is formed on one side, and the sides having the recess-and-projection shape are placed to oppose each other. A slider 101 is placed between the two stators 100a and 100b, and moves in the direction of extension of the stator 100.

The structure of the stators 100a and 100b will now be described. In the following, only one of the stators, the stator 100a, will be described, and the description of the other stator, stator 100b, will be omitted. The stator 100a is formed by arranging, along the direction of extension of the stator, three stator segments 102A, 102B, and 102C which are physically separated. When an individual stator segment does not need to be distinguished, the reference letters "A", "B", and "C" will be omitted, and the stator segment will be described with reference numeral "102". A length of each of the three stator segments is L0 (=L/3). Alternatively, the number of stator segments forming one stator may be other than 3. Alternatively, the lengths of the plurality of stator segments may differ from each other.

When the stator is formed by arranging a plurality of separate stator segments 102, the amount of deviation between the slider position and the pole position may differ for each stator segment depending on the size precision of an individual stator segment, mounting precision when the stator segment is fixed, etc.

The stators 100a and 100b may be manufactured by forming the recesses and projections by stamping with a punch a plurality of times on a band-shaped material (for example, an electromagnetic steel sheet) having a length L. The stator is formed by layering the stamped electromagnetic steel sheets. The punch is manufactured such that a range of the length L0 can be machined. In the manufacturing of the stator, first, a range of the band-shaped material having the length L corresponding to the position of the stator segment 102A on the left end in FIG. 4 is stamped with the punch. Then, the material is moved with respect to the punch to the left by the length L0 (alternatively, the material may be fixed and the punch may be moved to the right), and stamping is executed at a position of the stator segment 102B. These processes are repeated to form the recess-and-projection shape over the entire length of the material of the length L. The portion formed in one stamping may be considered as the stator segment.

In the stator formed by moving the material and stamping a plurality of times also, the amount of deviation between the slider position and the pole position may differ for each stator segment due to precision of the movement distance of the material, or the like.

A relationship between a thrust instruction value and a pole position correction value used for acquisition of the pole position correction value in the present embodiment will now be described.

Figure 5:
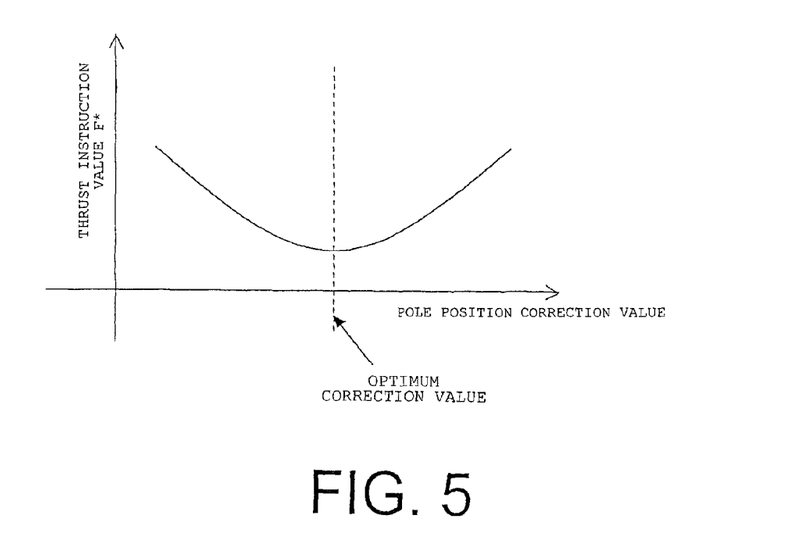
FIG. 5 is a diagram explaining a relationship between a pole position correction value and a thrust instruction value in the present invention.

FIG. 5 is a diagram showing a thrust instruction value F* when the pole position correction value is changed. According to FIG. 5, the thrust instruction value is the minimum when the pole position correction value is the optimum correction value shown in FIG. 5, and the thrust instruction is increased as the pole position correction value deviates from the optimum correction value because the thrust which can be generated with the same current is reduced. Based on this, the optimum pole position correction value can be acquired by detecting the size of the thrust instruction value F*. In order to utilize this relationship, the linear motor must be set in a constant thrust state.

Next, an adjustment procedure of the pole position correction method will be described. The pole position correction method may be executed by software control by the central processing unit 42 included in the controller 40, or, alternatively, a part of the procedure may be realized by a hardware element.

In FIG. 6, first, in step S8, the slider 101 is positioned at a predetermined stroke position opposing the first stator segment 102A. Then, in step S9, the slider 101 is fixed. The method of fixing may be restriction with a mechanical brake, restriction with an electrical brake, restriction with a fixing jig, etc.

Next, in step S10, a position instruction is sent to instruct a position distanced from the current position. That is, the position instruction X which is set by the position instruction setting unit 46 automatically or through a manual operation is input to the proportional amplifier 21. With this process, the linear motor is set in the constant thrust state.

On the other hand, in the memory 44 of the controller 40, the electrical angle offset value for designating a phase difference between the detection origin of the position detector 12 and the pole position of the slider and a pole position correction value for correcting the electrical angle offset value are stored in advance. The pole position correction value is set to be changeable manually or automatically.

Then, in step S12, the thrust instruction value F* of the linear motor is detected, and in the subsequent step S14, the thrust instruction value F* and a preset threshold value are compared. As the threshold value, a value which is stored in the memory 44 in advance corresponding to the position instruction X may be used. Alternatively, the threshold value may be set, for example, as 5% with respect to a minimum value of the thrust instruction value F* shown in FIG. 5. If the thrust instruction value F* is greater than or equal to the threshold value, the pole position correction value is changed in step S16, and the threshold instruction value F* is again detected and compared with the threshold value in steps S12 and S14. These operations are repeated until the thrust instruction value F* is less than the threshold value.

When a pole position correction value which sets the thrust instruction value F* to a value less than the threshold value is found, in step S18, the pole position correction value and a detection position of the position detector are stored in the memory 44 as the pole position correction value and the detection position of the first stator segment 102A.

The steps from S8 to S19 may be executed once after the linear motor and the position detector are mounted on the machine tool or the like and before the linear motor is driven. Later, these steps are executed when the relative position between the linear motor and the position detector is changed, such as when the linear motor or the position detector is exchanged or detached and reattached.

Next, in step S19, it is determined whether or not the pole position correction values are stored for the entire stroke length of the stator, and if the pole position correction values are not stored for the entire stroke length the steps S8-S18 are repeated. That is, the slider 101 is moved by the length L0 of the stator segment and positioned at a stroke position opposing the second stator segment 102B, the processes of step S9 and later steps are executed, and the pole position correction value and the detection position of the second stator segment 102B are stored in the memory 44. With a similar process, the pole position correction value and the detection position of the third stator segment 102C are stored in the memory 44.

Figure 7A:
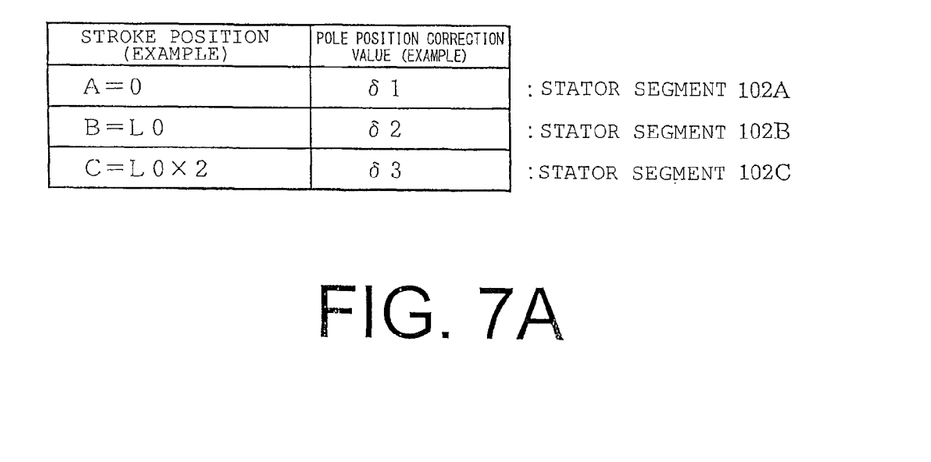
FIG. 7A is a diagram showing an example relationship between a stroke position and a pole position correction value.

The steps S8-S18 are repeated for the stroke length, and the detection position of the position detector (or the slider), that is, the stroke position and the pole position correction value at that position are stored in the memory 44 for the entire stroke. FIG. 7A shows a correspondence relationship between the stroke position and the pole position correction value.

Figure 7B:
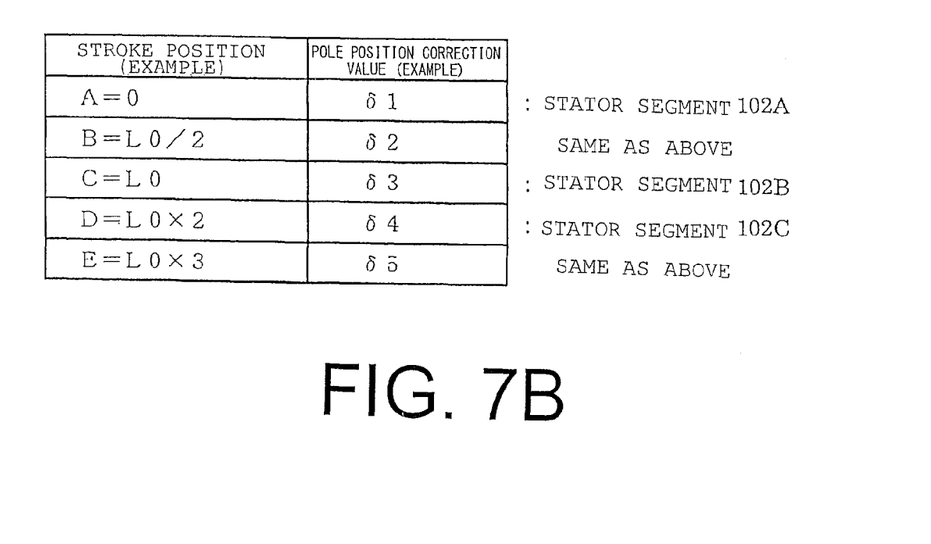
FIG. 7B is a diagram showing an example relationship between the stroke position and the pole position correction value.

In the above description, the slider 101 is moved by the length L0 of the stator segment because it is desirable for the detection position at each stator segment to be at the same location as much as possible, but it is only required that the position correction value and the detection position can be determined for each stator segment, and the slider does not necessarily need to be moved by the length L0. In addition, the number of locations for the position correction value and the detection position to be determined is not limited to one location for each stator segment, and alternatively, a plurality of locations may be employed. Alternatively, the number of detection positions may be changed for each stator segment. FIG. 7B shows an example of such a configuration.

Figure 7C:
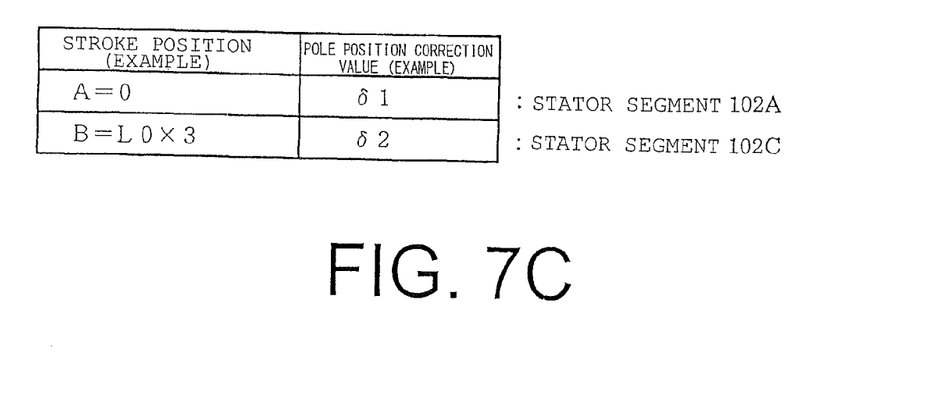
FIG. 7C is a diagram showing an example relationship between the stroke position and the pole position correction value.

Moreover, because each stator segment is stamped by the same punch, when it is judged that the variation in the length of the stator segment is small and the mounting error of each stator segment is small, the position correction value and the detection position do not necessarily need to be determined for all stator segments. In this case, the position correction values and the detection positions may be determined for the stator segments at both ends. FIG. 7C shows an example of such a configuration.

Figure 8:
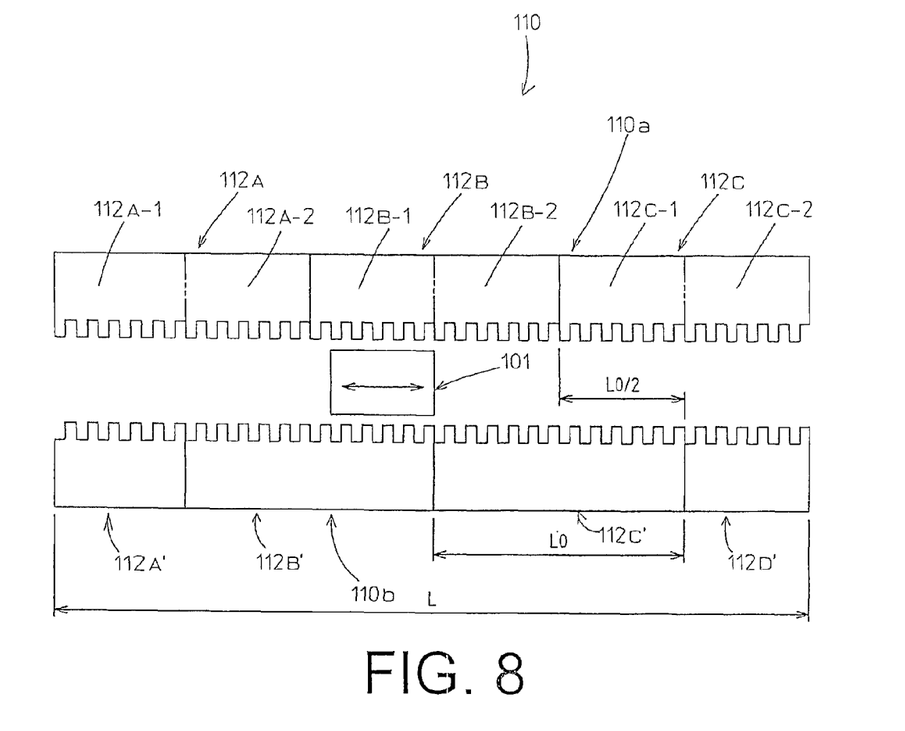
FIG. 8 is a diagram showing another example of a linear motor in which stator segments are arranged.

FIG. 8 shows another example structure of the stator. In two stators 110a and 110b, stator segments respectively belonging to the two stators are placed with a shift of ½ of a pitch from each other with respect to the arrangement pitch of the stator segment 112. The stator 110a is formed by arranging stator segments 112A, 112B, and 112C. The stator 110b is formed by arranging stator segments 112A', 112B', 112C', and 112D'. As shown in FIG. 8, the boundary of the stator segments 112 is shifted by ½ of the pitch between the two stators 110a and 110b.

In this case, a virtual stator segment is considered which is partitioned at the boundary of the stator segments 112 of the two stators 110a and 110b. More specifically, the stator segment 112A is considered to be formed by two virtual stator segments 112A-1 and 112A-2. Similarly, the stator segments 112B and 112C are considered to be formed respectively by virtual stator segments 112B-1 and 112B-2 and 112C-1 and 112C-2. The stator 110 is considered to be formed by arranging six stator segments 112A-1, 112A-2, 112B-1, 112B-2, 112C-1, and 112C-2, and position correction values corresponding to the six stator segments can be determined in a manner similar to the case of the stator 100 shown in FIG. 4.

Referring again to FIG. 6, the description of the flow is continued. The steps of correcting the electrical angle offset value based on the stroke position which is the detection position stored in the memory 44 and the pole position correction value and controlling the motor will be described. In step S20, the controller 40 detects a current stroke position of the slider 101, and in step S21, the controller 40 determines a pole position correction value 6 used for the current stroke position.

Step S21 will now be specifically described with reference to FIG. 9.

Figure 9:
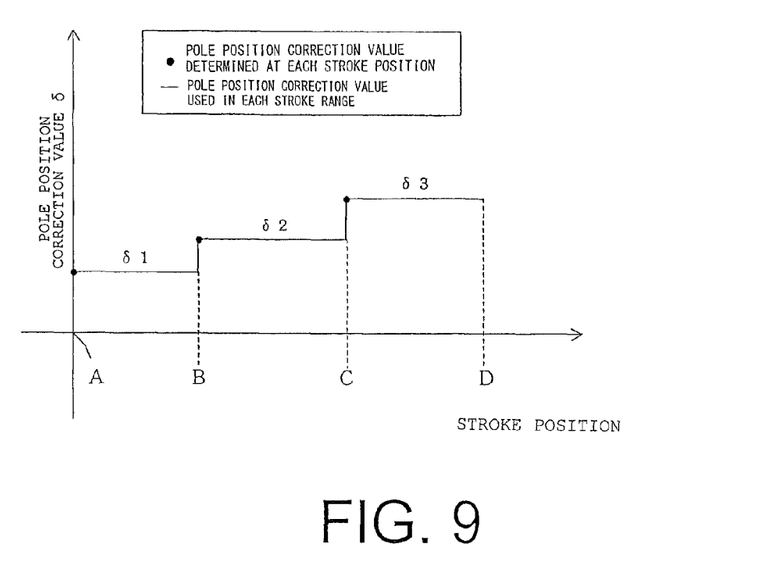
FIG. 9 is a diagram showing an example interpolation method of a pole position correction value in a section between stroke positions for which pole position correction values are acquired.

In FIG. 9, the relationship between the stroke position stored in the memory 44 and the pole position correction value at the stroke position is assumed to be that shown in FIG. 7A; that is, the pole position correction value at the stroke position A is assumed to be δ1, the pole position correction value at the stroke position B is assumed to be δ2, and the pole position correction value at the stroke position C is assumed to be δ3. In this case, the pole position correction value is changed depending on the stroke position such that the pole position correction value used at a position between the stroke positions A and B is δ1, the pole position correction value used at a position between the stroke positions B and C is δ2, . . . . In this method, the pole position correction value is determined according to where, among the stroke positions stored in the memory 44, the detected current stroke position of the slider 101 is positioned.

In step S22, the electrical angle offset value is corrected using the pole position correction value determined in step S21, that is, the pole position correction value is added to the original electrical angle offset value, and in step S23, the electrical angle offset value to which the pole position correction value is added is input from the controller 40 to the current distributor 23 and is used for the motor control.

As described above, according to the present embodiment, the thrust reduction due to the length size error of the stator at the stroke end and the mounting error can be reduced. The thrust reduction between the stroke positions can be further reduced by narrowing the detection spacing of the pole position correction value.

Figure 10:
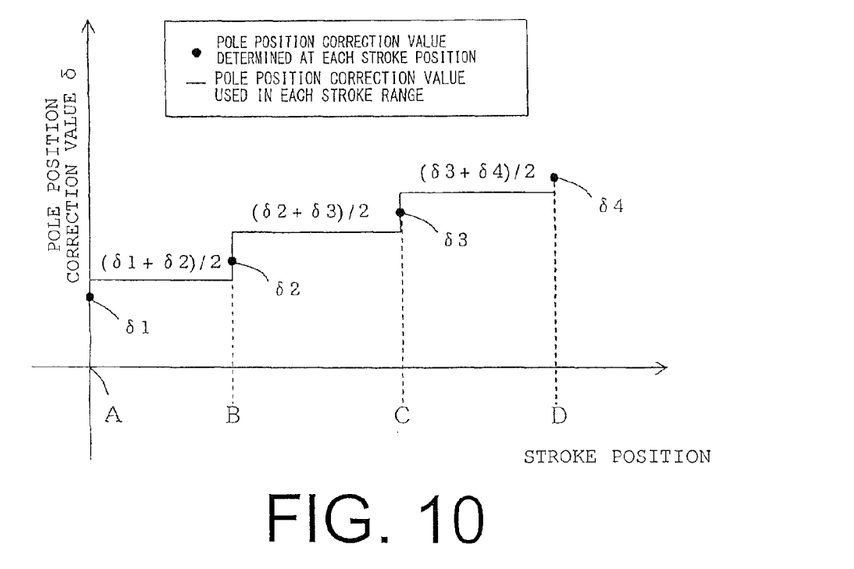
FIG. 10 is a diagram showing another example interpolation method of the pole position correction value in the section between stroke positions for which the pole position correction values are acquired.

FIG. 10 is a diagram showing an example interpolation method in a section between stroke positions when the pole position correction values are acquired at stroke positions distanced from each other. In the interpolation method of FIG. 10, the optimum value of the pole position correction value can be more precisely determined than with the method of FIG. 9.

The interpolation method of the pole position correction value shown in FIG. 10 differs from that of FIG. 9 in that an average value of adjacent correction values is used as the pole position correction value used in a section between predetermined stroke positions. This method will be more specifically described with reference to FIG. 10.

In FIG. 10, the pole position correction value at the stroke position A stored in the memory 44 is assumed to be δ1, the pole position correction value at the stroke position B is assumed to be δ2, and the pole position correction value at the stroke position C is assumed to be δ3. In this case, the pole position correction value used for the stroke position is calculated by determining an average value of adjacent correction values and is changed corresponding to the stroke position such that the pole position correction value used in the section between stroke positions A and B is an average value of δ1 and δ2, the pole position correction value used in a section between the stroke positions B and C is an average value of δ2 and δ3, . . . . In this method, it is determined where, among the stroke positions stored in the memory 44, the detected current stroke position of the slider 101 is positioned, and the pole position correction value is determined based on the pole position correction values of the stroke position and an adjacent stroke position. The electrical angle offset value corrected by this pole position correction value is input from the controller 40 to the current distributor 23, and is used for the motor control.

As described above, according to the present embodiment, the thrust reduction due to the length size error of the stator at the stroke end and the mounting error can be reduced. The thrust reduction between stroke positions can be further reduced by narrowing the detection spacing of the pole position correction value.

Figure 11:
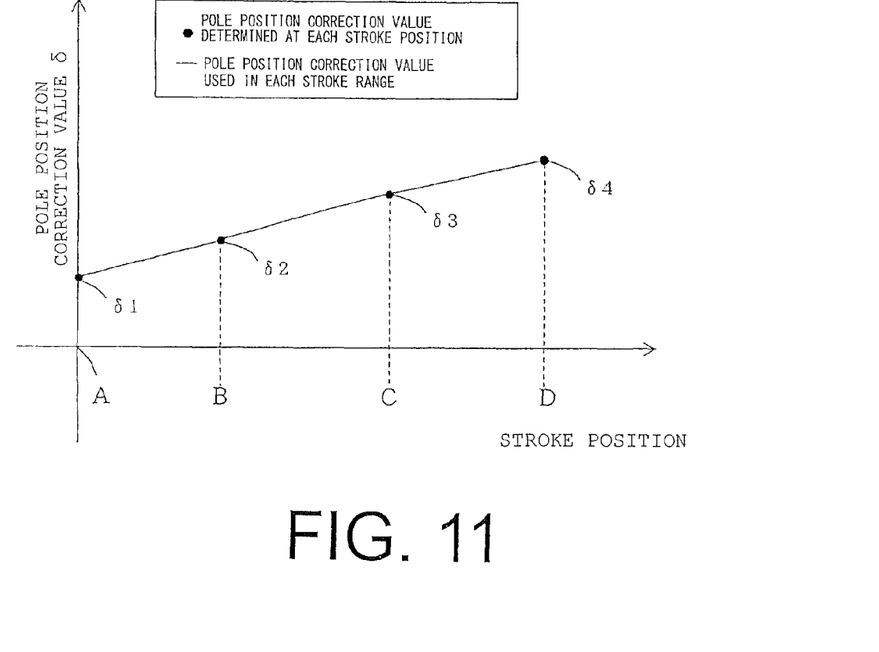
FIG. 11 is a diagram showing yet another example interpolation method of the pole position correction value in the section between stroke positions for which the pole position correction values are acquired.

FIG. 11 is a diagram showing another example interpolation method for a section between stroke positions when the pole position correction values are acquired at stroke positions distanced from each other. In the method of FIG. 11, the optimum value of the pole position correction value can be more precisely determined compared to the method of FIG. 9.

The interpolation method shown in FIG. 11 differs from the method of FIG. 9 in that a linear interpolation value between adjacent correction values is used as the pole position correction value used in a section between predetermined stroke positions. This method will be more specifically described with reference to FIG. 11.

In FIG. 11, the pole position correction value at the stroke position A stored in the memory 44 is assumed to be δ1, the pole position correction value at the stroke position B is assumed to be δ2, and the pole position correction value at the stroke position C is assumed to be δ3. In this case, the pole position correction value used at a stroke position is changed corresponding to the stroke position by calculating a value linearly interpolated between adjacent correction values such that the pole position correction value used in the section between the stroke positions A and B is a value obtained by linearly interpolating between δ1 and δ2, the pole position correction value used in the section between the stroke positions B and C is a value obtained by linearly interpolating between δ2 and δ3, . . . . In this method, it is determined where, among the stroke positions stored in the memory 44, the detected current stroke position of the slider 101 is positioned, and the pole position correction value is determined from a value linearly interpolating the pole position correction values between the adjacent stroke positions. An electrical angle offset value corrected by this pole position correction value is input from the controller 40 to the current distributor 23, and is used for the motor control.

As described above, according to the present embodiment, the thrust reduction due to the length size error of the stator at the stator end and the mounting error can be reduced. The thrust reduction between the stroke positions can be further reduced by narrowing the detection spacing of the pole position correction value.

In the interpolation methods shown in FIGS. 9-11, when the stator of the linear motor is formed by arranging a plurality of stator segments corresponding to the predetermined stroke length, the thrust reduction due to the length size error of each stator at the stroke end and the mounting error can be reduced. In this case, it is desirable to measure the pole position correction value at at least one location for each stator segment. For the pole position correction value acquired for a certain stator segment, it is possible to employ a configuration in which the same value as the acquired pole position correction value may be used within the range of the stator segment, and the value is not used for the other stator segments.

Figure 12:
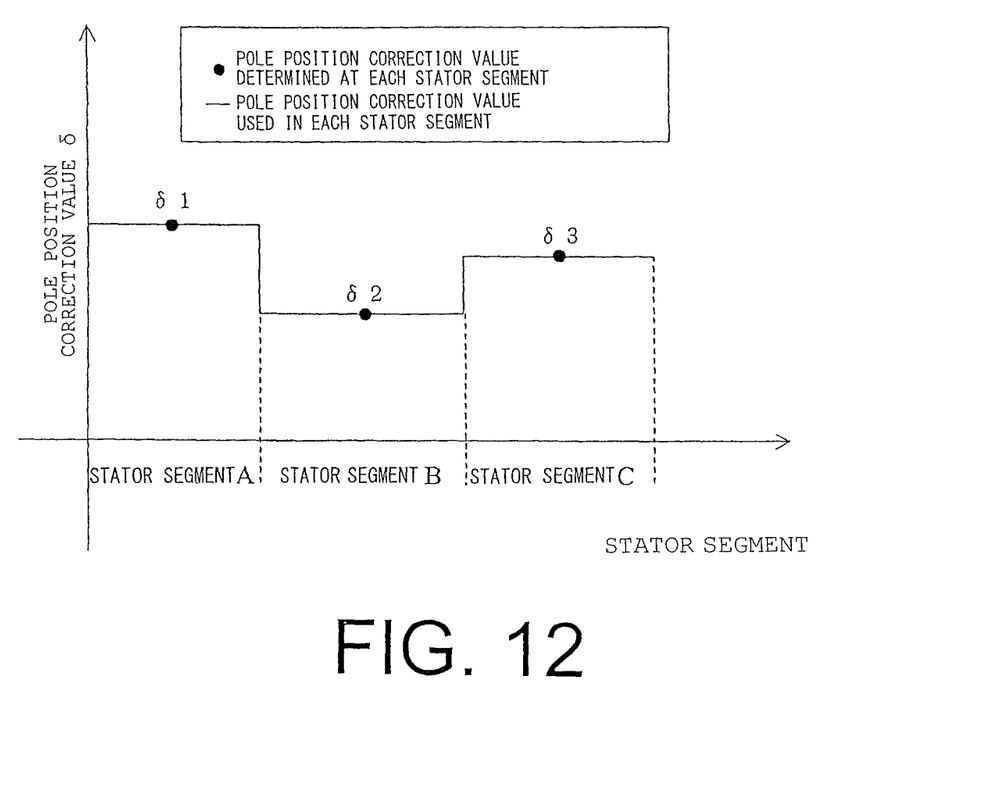
FIG. 12 is a diagram showing an example interpolation method within a range of stator segments when one pole position correction value is acquired for each stator segment.

In addition to the interpolation methods shown in FIGS. 9-11, there also exists an interpolation method as shown in FIG. 12. FIG. 12 is a diagram showing an example interpolation method within a range of stator segments when one pole position correction value is acquired for each stator segment. In FIG. 12, the pole position correction value at the stator segment A is assumed to be δ1, the pole position correction value at the stator segment B is assumed to be δ2, and the pole position correction value at the stator segment C is assumed to be δ3. In this case, the pole position correction value is changed according to the stator segment such that the pole position correction value used in the range of the stator segment A is δ1, the pole position correction value used in the range of the stator segment B is δ2, . . . . An electrical angle offset value corrected by this correction value is input from the controller 40 to the current distributor 23, and is used for the motor control.

When a plurality of pole correction values are acquired for each stator segment, the interpolation methods of FIGS. 10 and 11 may be applied for each stator segment, to prevent the thrust reduction within the range of each stator segment.

The present invention can also similarly reduce the thrust reduction of the linear motor when a plurality of sliders are placed in the direction of extension of the stator, that is, the stroke direction.

More specifically, when a plurality of sliders are placed, there are a case in which the same pole position correction value is assigned for all sliders, a case in which the sliders are divided into a plurality of groups and different pole position correction values are assigned for different groups, and a case in which different pole position correction values are assigned for all sliders. When the same pole position correction value is assigned for all sliders, because the sliders are placed a distance apart in the direction of extension of the stator, the optimum pole position correction value differs for different sliders, and the thrust is reduced for the sliders having the pole position correction values deviated from the optimum value. Therefore, normally, the sliders are divided into a plurality of groups and different pole position correction values are assigned to different groups, or different pole position correction values are assigned for all sliders. When different pole position correction values are assigned in this manner, the motor controller 50 of FIG. 3 must be individually provided for each pole position correction value. When the motor controller is, for example, built into a drive device of a motor (not shown), the drive devices are provided in a number corresponding to the number of groups of the sliders or the number of the sliders. In this case, the position detector 12 of FIG. 3 can be commonly used with other sliders. Based on the above, even when a plurality of sliders are placed, an advantage similar to the present invention can be obtained.

What is claimed is:

1. A method of controlling a linear motor having a stator which is provided in an extended manner and a slider which moves along the stator, the method comprising the steps of:
storing a stored pole position correction value in correspondence to each of a plurality of stroke positions along a direction of extension of the stator, the stored pole position correction value being a value for correcting a position deviation of a salient pole of the stator along the direction of extension of the stator;
detecting a stroke position of the slider which moves along the direction of extension of the stator;
deriving a derived pole position correction value at the detected stroke position of the slider based on the stored pole position correction value;
calculating a pole position of the slider which is a relative position of the pole of the slider with respect to the salient pole of the stator based on the detected stroke position of the slider and the derived pole position correction value; and
supplying electric power to a coil provided in the stator or in the slider based on the calculated pole position of the slider, and driving the linear motor.

2. The method of controlling the linear motor according to claim 1, wherein
the stator is formed by arranging a plurality of stator segments along the direction of extension of the stator, and
at least one stored pole position correction value is stored in advance for each stator segment.

3. The method of controlling the linear motor according to claim 2, wherein
the plurality of stator segments are separate members from each other.

4. The method of controlling the linear motor according to claim 2, wherein
the plurality of stator segments are each a portion formed by a single stamping when a single material is sequentially shifted along the direction of extension of the stator, with respect to a punch for stamping, and stamped a plurality of times.

5. The method of controlling the linear motor according to claim 1, wherein
for the stored pole position correction value, values at stroke positions distanced from each other are stored, and
the derived pole position correction value for a section between the stroke positions for which the values are stored is derived as a value equal to the stored pole position correction value at one end of the section.

6. The method of controlling the linear motor according to claim 1, wherein
for the stored pole position correction value, values at stroke positions distanced from each other are stored, and
the derived pole position correction value for a section between the stroke positions for which the values are stored is derived as an average value of the stored pole position correction values at both ends of the section.

7. The method of controlling the linear motor according to claim 1, wherein
for the stored pole position correction value, values at stroke positions distanced from each other are stored, and
the derived pole position correction value for a section between the stroke positions for which the values are stored is derived as a value obtained by linearly interpolating the stored pole position correction values at both ends of the section.

8. A method of calculating, in a linear motor having a stator which is provided in an extended manner and a slider which moves along the stator, a pole position of the slider which is a relative position of a pole of the slider with respect to a salient pole of the stator, the method comprising the steps of:
acquiring, at a plurality of stroke positions along a direction of extension of the stator, stored pole position correction values for correcting a position deviation of the salient pole of the stator along the direction of extension of the stator, and storing the stored pole position correction values in correspondence to the stroke positions along the direction of extension of the stator;
detecting a stroke position of the slider which moves along the direction of extension of the stator;
reading a stored pole position correction value corresponding to the detected stroke position of the slider, and calculating a derived pole position correction value at the detected stroke position of the slider; and
calculating the pole position of the slider based on the detected stroke position of the slider and the derived pole position correction value.

9. The method according to claim 8, wherein
the stator is formed by arranging a plurality of stator segments along the direction of extension of the stator, and
at least one stored pole position correction value is acquired and stored for each stator segment.

10. The method according to claim 9, wherein
the plurality of stator segments are separate members from each other.

11. The method according to claim 9, wherein
the plurality of stator segments are each a portion formed by a single stamping when a single material is sequentially shifted along the direction of extension of the stator, with respect to a punch for stamping, and stamped a plurality of times.

12. The method according to claim 8, wherein
the stator is one stator formed by consecutively arranging, along a longitudinal direction of the stator, stator segments formed by stamping, and
at least one stored pole position correction value is acquired and stored for each stator segment.

13. The method of controlling the linear motor according to claim 8, wherein
for the stored pole position correction value, values at stroke positions distanced from each other are stored, and
the derived pole position correction value for a section between the stroke positions for which the values are stored is derived as an average value of the stored pole position correction values at both ends of the section.

14. The method of controlling the linear motor according to claim 8, wherein
for the stored pole position correction value, values at stroke positions distanced from each other are stored, and
the derived pole position correction value for a section between the stroke positions for which the values are stored is derived as a value obtained by linearly interpolating the stored pole position correction values at both ends of the section.

\* \* \* \* \*